(12) United States Patent  (10) Patent No.: US 7,752,188 B2
Lagerstedt et al.  (45) Date of Patent: Jul. 6, 2010

(54) WEATHER INFORMATION IN A CALENDAR

(75) Inventors: Anna-Maria Lagerstedt, Lund (SE);
Eral Denis Foxenland, Malmo (SE);
Randi-Lise Hjelmeland Almas, Malmo
(SE); Lisa Wiveca Lindahl, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 337 days.

(21) Appl. No.: 11/675,807

(22) Filed: Feb. 16, 2007

(65) Prior Publication Data

US 2008/0201647 A1    Aug. 21, 2008

(51) Int. Cl.
*G06F 17/30* (2006.01)
(52) U.S. Cl. .................. 707/705; 707/951; 702/3
(58) Field of Classification Search .............. None
See application file for complete search history.

(56) References Cited

U.S. PATENT DOCUMENTS

| | | | | |
|---|---|---|---|---|
| 6,496,780 B1* | 12/2002 | Harris et al. | | 702/3 |
| 6,934,740 B1* | 8/2005 | Lawande et al. | | 709/213 |
| 6,961,061 B1 | 11/2005 | Johnson et al. | | |
| 6,985,837 B2* | 1/2006 | Moon et al. | | 703/3 |
| 7,080,018 B1* | 7/2006 | Fox et al. | | 705/1 |
| 7,250,952 B2* | 7/2007 | Johnson et al. | | 345/473 |
| 7,441,194 B2* | 10/2008 | Vronay et al. | | 715/738 |
| 2001/0003846 A1* | 6/2001 | Rowe et al. | | 725/47 |
| 2002/0130899 A1* | 9/2002 | Ryan et al. | | 345/738 |
| 2002/0131565 A1 | 9/2002 | Scheuring et al. | | |
| 2002/0133385 A1* | 9/2002 | Fox et al. | | 705/7 |
| 2003/0206182 A1* | 11/2003 | Kelly et al. | | 345/632 |
| 2005/0108234 A1* | 5/2005 | Oksanen et al. | | 707/9 |

FOREIGN PATENT DOCUMENTS

| | | |
|---|---|---|
| EP | 0 744 703 | 11/1996 |
| WO | WO 02/17075 A2 | 2/2002 |
| WO | WO 02/17075 A3 | 2/2002 |
| WO | WO 03/075547 A2 | 9/2003 |

OTHER PUBLICATIONS

PlainSight Desktop Calendar. http://fileforum.betanews.com/detail/PlainSight-Desktop-Calendar/1138240207/1. Apr. 9, 2006.*
CalendarPal 1.0. http://rares.moldoveanu.vimore.com/www.tweakyourwindows.com/Software-Details/35659/CalendarPal.html. Apr. 21, 2006.*

(Continued)

*Primary Examiner*—John R. Cottingham
*Assistant Examiner*—Robert Timblin
(74) *Attorney, Agent, or Firm*—Harrity & Harrity, LLP

(57) ABSTRACT

A system receives location information from a user, retrieves weather information based on the received location information, retrieves calendar information associated with the user, and associates the weather information with the calendar information in a calendar application.

15 Claims, 15 Drawing Sheets

OTHER PUBLICATIONS

Notification of Transmittal of the International Search Report and the Written Opinion of the International Searching Authority, or the Declaration corresponding to PCT/IB2007/053273, Jan. 29, 2009, 22 pages.

Partial International Search dated Mar. 19, 2008 issued in corresponding International Application No. PCT/IB2007/053273, 3 pages.

K. F. Eustice et al., "A Universal Information Appliance". IBM Systems Journal, vol. 38, No. 4, New York, Dec. 1999, pp. 575-601.

"Electronic Climatical Scheduler Mechanism". IBM Technical Disclosure Bulletin, vol. 37, No. 04A, New York, Apr. 1994, pp. 121 and 122.

* cited by examiner

```
┌─────────────────────────────┐
│      CALENDAR MODULE        │
│            510              │
└─────────────────────────────┘

┌─────────────────────────────┐
│       WEATHER MODULE        │
│            520              │
└─────────────────────────────┘
```

FIG. 6

| JANUARY 2007 | | | | | | |
|---|---|---|---|---|---|---|
| Monday | Tuesday | Wednesday | Thursday | Friday | Saturday | Sunday |
| 1 SNOW HI – 32F LO – 30F | 2 RAIN HI – 42F LO – 38F | 3 CLOUDY HI – 45F LO – 40F | 4 SUNNY HI – 48F LO – 42F MEETING | 5 SUNNY HI – 32F LO – 28F | 6 P/CLOUDY HI – 41F LO – 33F | 7 P/CLOUDY HI – 43F LO – 36F |
| 8 SUNNY HI – 34F LO – 27F | 9 P/CLOUDY HI – 34F LO – 23F | 10 SUNNY HI – 39F LO – 38F | 11 P/CLOUDY HI – 44F LO – 35F | 12 SUNNY HI – 29F LO – 19F | 13 SNOW HI – 28F LO – 20F | 14 SNOW HI – 26F LO – 17F |
| 15 FLURRIES HI – 26F LO – 21F | 16 P/CLOUDY HI – 31F LO – 22F | 17 CLOUDY HI – 40F LO – 37F TELECONF. | 18 SHOWERS HI – 43F LO – 39F | 19 CLOUDY HI – 47F LO – 42F MEETING | 20 SUNNY HI – 52F LO – 48F | 21 SUNNY HI – 44F LO – 35F |
| 22 P/CLOUDY HI – 42F LO – 31F | 23 SUNNY HI – 41F LO – 33F | 24 SUNNY HI – 43F LO – 40F | 25 RAIN HI – 45F LO – 42F MEETING | 26 RAIN HI – 46F LO – 44F | 27 SUNNY HI – 32F LO – 28F | 28 SUNNY HI – 22F LO – 18F |
| 29 CLOUDY HI – 35F LO – 30F | 30 CLOUDY HI – 31F LO – 25F | 31 SNOW HI – 30F LO – 20F MEETING | | Current Location: Wilmington, Delaware [Change Current Location] | | |

600, 610, 620, 630, 640

WEATHER INFORMATION IN A CALENDAR

BACKGROUND

Calendar applications provide many functions. For example, many calendar applications enable a user to schedule events (e.g., a meeting, a barbecue, etc.), to track events, to maintain an address book, etc. However, calendar applications do not provide weather information, which may be helpful to a user planning an event, such as an outdoor event. Thus, a calendar application user may have to obtain weather information elsewhere (e.g., via web site providing weather information) before planning an event.

SUMMARY

According to one aspect, a method may include receiving location information from a user, retrieving weather information based on the received location information, retrieving calendar information associated with the user, and associating the weather information with the calendar information in a calendar application.

Additionally, the method may include displaying the associated weather information and calendar information to the user.

Additionally, displaying the associated weather information may include displaying, to the user, at least one of textual, video, image, animation, or audio weather information associated with the calendar information.

Additionally, receiving location information from the user may include at least one of receiving location information related to a location of the user, or receiving location information unrelated to the location of the user.

Additionally, retrieving weather information may include at least one of retrieving one of past, present, or future weather information based on the received location information or retrieving one of monthly, weekly, daily, or hourly weather information based on the received location information.

Additionally, retrieving calendar information may include retrieving the calendar application for use by the user.

Additionally, retrieving the calendar application may include at least one of retrieving an Internet-based calendar application, retrieving a calendar creation application, or retrieving a personal information manager (PIM) application.

According to another aspect, a method may include receiving a time period and a location in a calendar-based application, retrieving weather information based on the received time period and location, and generating a time lapse weather video or animation based on the retrieved weather information.

Additionally, the method may include generating one of a weather summary or weather statistics based on the retrieved weather information.

Additionally, the method may include generating calendar related information associated with the time period.

Additionally, generating a time lapse weather video or animation may include generating the time lapse weather video or animation based on how quickly a user is browsing through dates of the calendar-based application.

Additionally, generating a time lapse weather video or animation may include calculating a browsing speed of a user through dates of the calendar-based application in a number of days passed per unit time, determining a pause time of the user at particular dates of the calendar-based application, determining weather differences between browsed dates of the calendar-based application, and dynamically generating the time lapse weather video or animation and the transitions within the time lapse weather video or animation based on the browsing speed, the pause time, and the weather differences.

According to yet another aspect, a method may include receiving a weather-based search query in a calendar-based application, identifying weather information related to the weather-based search query, identifying calendar dates associated with the identified weather information, ranking the calendar dates based on a degree of match between the identified weather information and the weather-based search query, sorting the ranked calendar dates based on the ranks, and generating weather-based search results based on the sorted calendar dates.

Additionally, the method may include receiving selection of a weather-based search result, and generating weather information and calendar information associated with the selected weather-based search result.

Additionally, receiving a weather-based search query in a calendar-based application may include receiving at least one of a weather type, a temperature range, or a location with the weather-based search query.

Additionally, identifying weather information related to the weather-based search query may include searching past weather information based on the weather-based search query.

According to a further aspect, a method may include receiving a weather-based calendar event search query in a calendar-based application, identifying weather information related to the weather-based calendar event search query, identifying calendar dates associated with the identified weather information, ranking the calendar dates based on a degree of match between the identified weather information and the weather-based calendar event search query, sorting the ranked calendar dates based on the ranks, and recommending calendar event dates based on the sorted calendar dates.

Additionally, the method may include receiving selection of a recommended calendar event date, and scheduling a calendar event in the calendar-based application on the selected calendar event date.

Additionally, receiving a weather-based calendar event search query in a calendar-based application may include receiving at least one of an event type, a time period, or a location with the weather-based calendar event search query.

Additionally, identifying weather information related to the weather-based calendar event search query may include searching future weather information based on the weather-based calendar event search query.

According to another aspect, a system may be implemented within at least one of a server, a user device, or a combination of the server and the user device, and may include means for receiving location information from one of a user or a user device in a calendar-based application, means for retrieving weather information based on the received location information, means for retrieving calendar information associated with the user from the calendar-based application, means for associating the weather information with the calendar information in the calendar-based application, and means for displaying the associated weather information and calendar information in the calendar-based application.

Additionally, the system may include means for receiving a time period in the calendar-based application, means for retrieving time period weather information based on the time period and the location information, and means for generating a time lapse weather video or animation based on the retrieved time period weather information.

Additionally, the system may include means for receiving a weather-based search query in the calendar-based application, means for identifying query weather information and calendar dates related to the weather-based search query, means for ranking the calendar dates based on a degree of match between the identified query weather information and the weather-based search query, means for sorting the ranked calendar dates based on the ranks, and means for generating weather-based search results based on the sorted calendar dates.

Additionally, the system may include means for receiving a weather-based calendar event search query in the calendar-based application, means for identifying query weather information and calendar dates related to the weather-based calendar event search query, means for ranking the calendar dates based on a degree of match between the identified query weather information and the weather-based calendar event search query, means for sorting the ranked calendar dates based on the ranks, and means for recommending calendar event dates based on the sorted calendar dates.

According to a further aspect, a device may include a memory to store a plurality of instructions, and a processor to execute instructions in the memory. The processor may receive location information from a user, retrieve weather information based on the received location information, retrieve calendar information associated with the user, and associate the weather information with the calendar information in a calendar-based application.

Additionally, the processor may further executes instructions in the memory to receive a time period in the calendar-based application, retrieve time period weather information based on the time period and the location information, and generate a time lapse weather video or animation based on the retrieved time period weather information.

Additionally, the processor may further executes instructions in the memory to receive a weather-based search query in the calendar-based application, identify query weather information and calendar dates related to the weather-based search query, rank the calendar dates based on a degree of match between the identified query weather information and the weather-based search query, sort the ranked calendar dates based on the ranks, and generate weather-based search results based on the sorted calendar dates.

Additionally, the processor may further executes instructions in the memory to receive a weather-based calendar event search query in the calendar-based application, identify query weather information and calendar dates related to the weather-based calendar event search query, rank the calendar dates based on a degree of match between the identified query weather information and the weather-based calendar event search query, sort the ranked calendar dates based on the ranks, and recommend calendar event dates based on the sorted calendar dates.

According to still another aspect, a computer-readable medium may store computer-executable instructions to receive location information from a user, retrieve weather information based on the received location information, retrieve calendar information associated with the user, and associate the weather information with the calendar information in a calendar-based application.

Additionally, the computer-readable medium may further store computer-executable instructions to receive a time period in the calendar-based application, retrieve time period weather information based on the time period and the location information, and generate a time lapse weather video or animation based on the retrieved time period weather information.

Additionally, the computer-readable medium may further store computer-executable instructions to receive a weather-based search query in the calendar-based application, identify query weather information and calendar dates related to the weather-based search query, rank the calendar dates based on a degree of match between the identified query weather information and the weather-based search query, sort the ranked calendar dates based on the ranks, and generate weather-based search results based on the sorted calendar dates.

Additionally, the computer-readable medium may further store computer-executable instructions to receive a weather-based calendar event search query in the calendar-based application, identify query weather information and calendar dates related to the weather-based calendar event search query, rank the calendar dates based on a degree of match between the identified query weather information and the weather-based calendar event search query, sort the ranked calendar dates based on the ranks, and recommend calendar event dates based on the sorted calendar dates.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 5 is a diagram of a portion of an exemplary computer-readable medium that may be associated with the user device and/or the server of FIGS. 1 and 4;

FIG. 6 is a diagram of an exemplary monthly display that may be provided by the user device of FIG. 1;

DETAILED DESCRIPTION

The following detailed description refers to the accompanying drawings. The same reference numbers in different drawings may identify the same or similar elements. Also, the following detailed description does not limit the invention.

Overview

Implementations described herein may provide weather information with a calendar application. For example, in one implementation, the weather information may be displayed in the calendar application on a monthly, weekly, daily, hourly, per calendar event, etc. basis for past, present, and/or future weather. In another implementation, the weather information may be associated with a location selected by a user of the calendar application and/or a location indicating the current location of the calendar application user. In still another implementation, the calendar application user may specify a time period and/or a location, and the calendar application may generate a time lapse weather video and/or animation, a weather summary, weather statistics, and/or other calendar information associated with the time period and/or location.

In a further implementation, the calendar application user may provide a weather-based search query (e.g., which may include a type of weather, a temperature range, a location, etc.), and the calendar application may provide a list of one or more day(s) matching the weather-based search query. If the user selects a particular day, the calendar application may provide weather information for the selected day and/or other calendar information associated with the selected day. In still a further implementation, the calendar application user may provide a weather-based calendar event search query (e.g., which may include an event type, a time period, a location, etc.), and the calendar application may recommend a list of one or more day(s) matching the weather-based calendar event search query. The user may select a recommended day from the list, and the event may be added to the calendar application on the selected date.

Implementations described herein may be utilized in any system and/or method that provides a calendar application and/or calendar functions. For example, implementations described herein may be utilized in a calendar application provided on a telephone, a personal digital assistant (PDA), a computer, a laptop, or another type of computation or communication device, a thread or process running on one of these devices, and/or an object executable by one of these devices.

Exemplary Network Configuration

Figure 1:
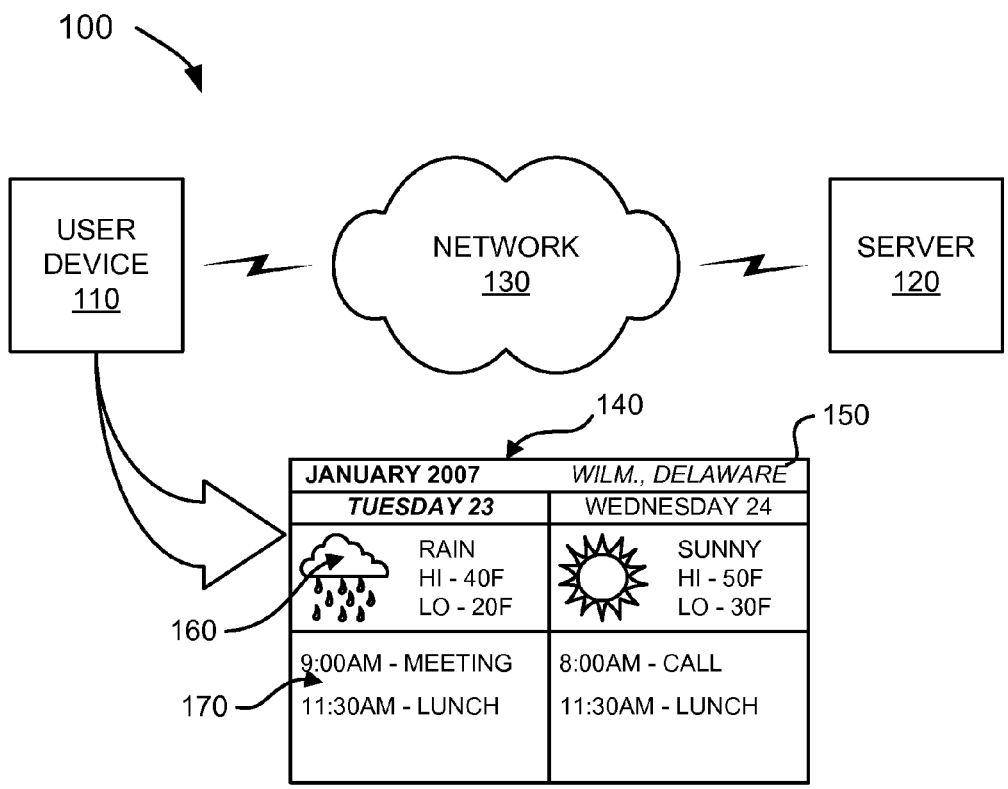
FIG. 1 is an exemplary diagram of a network in which systems and methods described herein may be implemented.

FIG. 1 is an exemplary diagram of a network 100 in which systems and methods described herein may be implemented. Network 100 may include a user device 110 connected to a server 120 via a network 130. One user device 110 and one server 120 have been illustrated as connected to network 130 for simplicity. In practice, there may be more user devices and/or servers. Also, in some instances, a user device may perform one or more functions of a server and a server may perform one or more functions of a user device.

User device 110 may include one or more entities. An entity may be defined as a device, such as telephone, a cellular phone (e.g., providing Internet-based applications, such as a Wireless Application Protocol (WAP) site), a personal computer, a personal digital assistant (PDA), a laptop, or another type of computation or communication device, a thread or process running on one of these devices, and/or an object executable by one of these devices. In one implementation, user device 110 may provide a calendar application, calendar information, and/or weather information in a manner described herein.

Server 120 may include one or more server entities that gather, process, search, and/or provide information in a manner described herein. For example, in one implementation, server 120 may provide a calendar application, calendar information, and/or weather information in a manner described herein.

Network 130 may include a local area network (LAN), a wide area network (WAN), a metropolitan area network (MAN), a telephone network, such as the Public Switched Telephone Network (PSTN) or a cellular telephone network, an intranet, the Internet, or a combination of networks. User device 110 and server 120 may connect to network 130 via wired, wireless, and/or optical connections.

As further shown in FIG. 1, user device 110 may provide a calendar application 140 that includes a location 150 (e.g., "Wilmington, Del."), weather information 160 (e.g., a visual, audio, and/or textual representation of the weather) associated with location 150 and a particular date on the calendar (e.g., "Jan. 23, 2007"), and/or calendar information 170 (e.g., a "Meeting," "Lunch," a "Call," etc.) associated with the particular calendar date. Location 150 may be input by a user of user device 110 and/or may be determined based on the location of user device 110 (e.g., via global positioning satellite (GPS) communication). Weather information 160 may be displayed in calendar application 140 on a monthly, weekly, daily, hourly, per calendar event, etc. basis for past, present, and/or future weather.

Although FIG. 1 shows user device 110 connected to server 120 via network 130, in other implementations, the systems or methods described herein may be performed solely with user device 110.

Exemplary User Device Configuration

Figure 2:
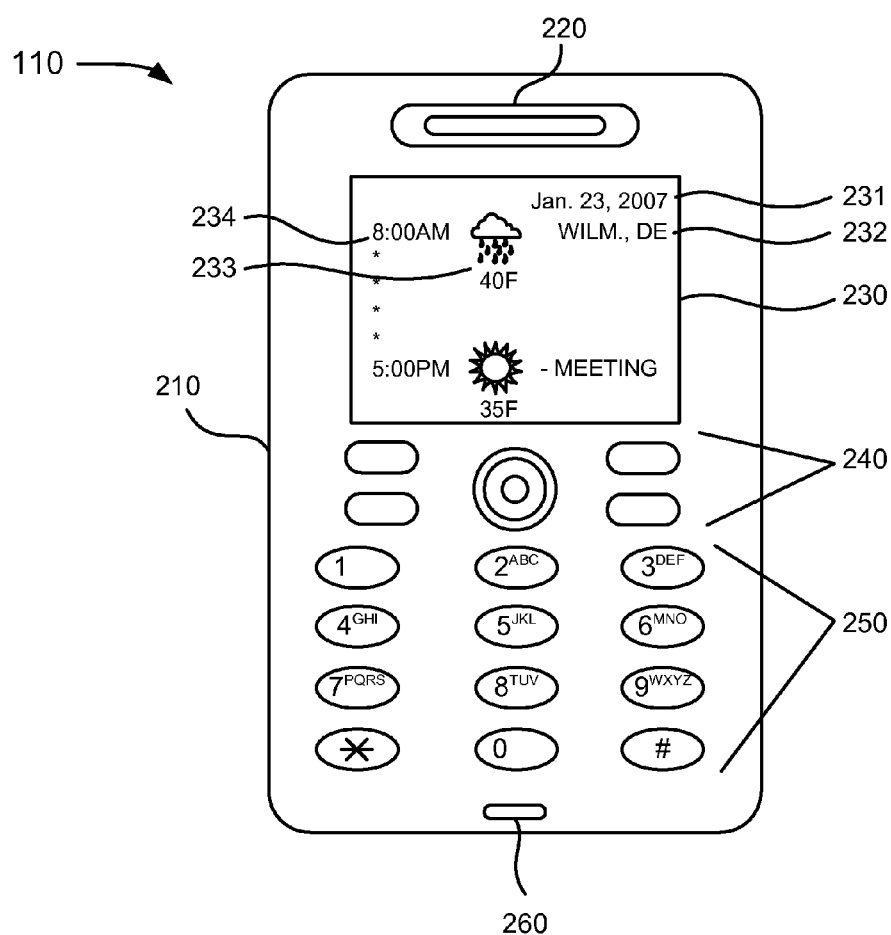
FIG. 2 is an exemplary front view of the user device of FIG. 1.

FIG. 2 is an exemplary front view of user device 110 in one implementation described herein. As shown in FIG. 2, user device 110 may include a housing 210, a speaker 220, a display 230, control buttons 240, a keypad 250, and/or a microphone 260. Housing 210 may protect the components of user device 110 from outside elements. Speaker 220 may provide audible information to a user of user device 110.

Display 230 may provide visual information to the user. For example, display 230 may display text input into user device 110, text and/or graphics received from another device, such as server 120, and/or information regarding incoming or outgoing calls, media, games, phone books, address books, the current time, etc. In one implementation, as shown in FIG. 2, display 230 may provide calendar information associated with a calendar application provided on user device 110 or received from another device (e.g., server 120). The calendar application may display a date 231 (e.g., "Jan. 23, 2007"), a location 232 (e.g., "Wilmington, Del."), and/or weather information 233 associated with a time entry 234 (e.g., "8:00 AM"). In other implementations, the calendar application may display other information, such as calendar information (e.g., a meeting is to be held at 5:00 PM), the current time, temperature information, etc.

Control buttons 240 may permit the user to interact with user device 110 to cause user device 110 to perform one or more operations. For example, control buttons 240 may be used to cause user device 110 to transmit information. Keypad 250 may include a standard telephone keypad. Microphone 260 may receive audible information from the user.

Although FIG. 2 shows exemplary components of user device 110, in other implementations, user device 110 may contain fewer, different, or additional components than depicted in FIG. 2. In still other implementations, one or more components of user device 110 may perform the tasks performed by one or more other components of user device 110.

Figure 3:
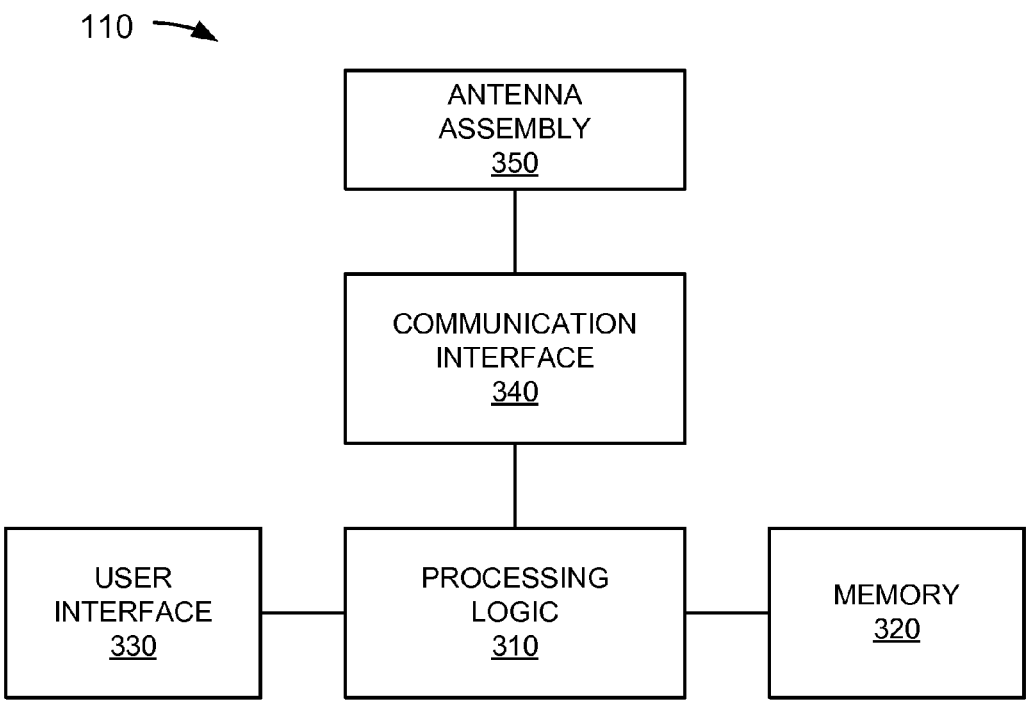
FIG. 3 is a diagram of exemplary components of the user device of FIG. 2.

FIG. 3 is a diagram of exemplary components of user device 110. As shown in FIG. 3, user device 110 may include processing logic 310, memory 320, a user interface 330, a communication interface 340, and/or an antenna assembly 350. Processing logic 310 may include a processor, microprocessor, an application specific integrated circuit (ASIC), field programmable gate array (FPGA), or the like. Processing logic 310 may control operation of user device 110 and its components. Memory 320 may include a random access memory (RAM), a read only memory (ROM), and/or another type of memory to store data and instructions that may be used by processing logic 310.

User interface 330 may include mechanisms for inputting information to user device 110 and/or for outputting information from user device 110. Examples of input and output mechanisms might include buttons (e.g., control buttons 240, keys of keypad 250, a joystick, etc.) to permit data and control commands to be input into user device 110; a speaker (e.g., speaker 220) to receive electrical signals and output audio signals; a microphone (e.g., microphone 260) to receive audio signals and output electrical signals; a display (e.g., display 230) to output visual information (e.g., text input into user device 110); and/or a vibrator to cause user device 110 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals. Antenna assembly 350 may include one or more antennas to transmit and/or receive RF signals over the air. Antenna assembly 350 may, for example, receive RF signals from communication interface 340 and transmit them over the air and receive RF signals over the air and provide them to communication interface 340. In one implementation, for example, communication interface 340 may communicate with a network, such as network 130.

As will be described in detail below, user device 110 may perform certain operations in response to processing logic 310 executing software instructions of an application contained in a computer-readable medium, such as memory 320. A computer-readable medium may be defined as a physical or logical memory device and/or carrier wave. The software instructions may be read into memory 320 from another computer-readable medium or from another device via communication interface 340. The software instructions contained in memory 320 may cause processing logic 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of user device 110, in other implementations, user device 110 may contain fewer, different, or additional components than depicted in FIG. 3. In still other implementations, one or more components of user device 110 may perform the tasks performed by one or more other components of user device 110.

Exemplary Server Configuration

Figure 4:
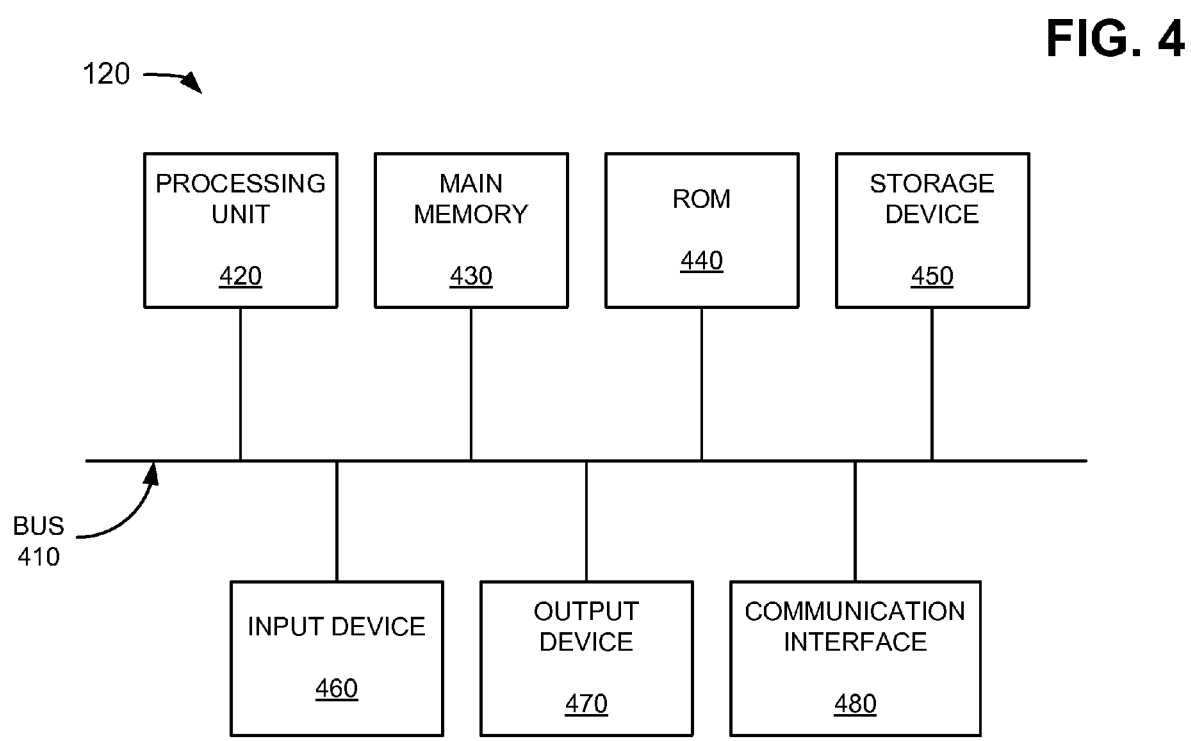
FIG. 4 is an exemplary diagram of the server of FIG. 1.

FIG. 4 is an exemplary diagram of server 120 in an implementation described herein. As illustrated, server 120 may include a bus 410, a processing unit 420, a main memory 430, a read-only memory (ROM) 440, a storage device 450, an input device 460, an output device 470, and/or a communication interface 480. Bus 410 may include a path that permits communication among the components of server 120.

Processing unit 420 may include a processor, microprocessor, or other type of processing logic that may interpret and execute instructions. Main memory 430 may include a random access memory (RAM) or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive.

Input device 460 may include a mechanism that permits an operator to input information to server 120, such as a keyboard, a mouse, a pen, a microphone, voice recognition and/or biometric mechanisms, etc. Output device 470 may include a mechanism that outputs information to the operator, including a display, a printer, a speaker, etc. Communication interface 480 may include any transceiver-like mechanism that enables server 120 to communicate with other devices and/or systems. For example, communication interface 480 may include mechanisms for communicating with another device or system via a network, such as network 130.

As will be described in detail below, server 120 may perform certain operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of server 120, in other implementations, server 120 may contain fewer, different, or additional components than depicted in FIG. 4. In still other implementations, one or more components of server 120 may perform the tasks performed by one or more other components of server 120.

Exemplary Computer-Readable Medium

FIG. 5 is a diagram of a portion of an exemplary computer-readable medium 500 that may be associated with user device 110 and/or server 120. In one implementation computer-readable medium 500 may correspond to memory 320 of user device 110. In another implementation, computer-readable medium 500 may correspond to main memory 430 of server 120. The portion of computer-readable medium 500 illustrated in FIG. 5 may include a calendar module 510 and a weather module 520. In one implementation, calendar module 510 and weather module 520 may be provided in user device 110 and/or in server 120 (e.g., and may be accessible by user device 110 via communication interface 340). In other implementations, calendar module 510 may be provided in user device 110 and weather module 520 may be provided in server 120, or vice versa.

Calendar module 510 may provide a calendar application for use by user device 110. For example, calendar module 510 may include Internet-based calendar applications (e.g., Google Calendar, Yahoo! Calendar, etc.), calendar creation applications (e.g., Calendar Creator, Simply Calendars, EZ Photo Calendar Creator, Active Desktop Calendar, My Photo Calendar, A Better Calendar, Calendar Builder, Screen Calendar, Birthday Keeper, Monkeymen Calendar, Calendar Wizard, Magic Calendar Maker, etc.), personal information manager (PIM) applications (e.g., Microsoft Outlook, IBM Lotus Organizer, etc.), etc. In other examples, calendar module 510 may provide any calendar application, for use by user device 110, which may benefit from inclusion of weather information with calendar information.

In one implementation, calendar module 510 may receive a user-specified time period and/or location, and may generate a time lapse weather video and/or animation, a summary of weather information, weather statistics, and/or other calendar information associated with the time period and/or location. In another implementation, calendar module 510 may receive a weather-based search query (e.g., which may include a type of weather, a temperature range, a location, etc.), and may provide a list of one or more day(s) matching the weather-based search query. If the user selects a particular day, calendar module 510 may provide weather information for the selected day and/or other calendar information associated with the selected day. In still another implementation, calendar module 510 may receive a weather-based calendar event search query (e.g., which may include an event type, a time period, a location, etc.), and may recommend a list of one or more day(s) matching the weather-based calendar event search query. The user may select a recommended day from the list, and calendar module 510 may add the event to the calendar on the selected date.

Weather module 520 may provide weather information (e.g., sun, rain, showers, drizzle, cloudy, partly cloudy, snow, sleet, freezing rain, flurries, barometric pressure, temperature (e.g., high or low temperatures), wind chill, dewpoint, humidity, heat index, and/or any other information associated with weather) which may be included with the calendar information provided by calendar module 510. For example, in one implementation, weather module 520 may provide the weather information in the calendar application (e.g., provided by calendar module 510) on a monthly, weekly, daily, hourly, per calendar event, etc. basis for past, present, and/or future weather. In another implementation, the weather information may be associated with a location selected by a user of calendar module 510 and/or a location indicating the current location of the user of calendar module 510.

Although FIG. 5 shows exemplary modules of computer-readable medium 500, in other implementations, computer-readable medium 500 may contain fewer, different, or additional modules than depicted in FIG. 5. In still other implementations, one or more modules of computer-readable medium 500 may perform the tasks performed by one or more other modules of computer-readable medium 500.

Exemplary Weather Displays

Weather module 520 may provide the weather information in the calendar application (e.g., provided by calendar module 510) on a monthly, weekly, daily, hourly, per calendar event, etc. basis for past, present, and/or future weather. For example, FIG. 6 is a diagram of an exemplary monthly display 600 that may be provided by user device 110 (e.g., by display 230 of user device 110). As shown, display 600 may include a monthly calendar (e.g., for the month of "January 2007") that depicts the days of the month, a current location 610, a mechanism 620 to enable current location 610 to be changed, weather information 630 associated with each calendar day and current location 610, and/or calendar information 640 associated with each calendar day.

Current location 610 may provide an indication of a current location setting for user device 110. For example, in one implementation, current location 610 may be based on the actual location of user device 110, and may be determined in a variety of ways, e.g., using Bluetooth communication, GPS communication, cell identification, wireless fidelity (Wi-Fi) communication, World Interoperability for Microwave Access (WiMAX) communication, Near Field Communication (NFC) technology, ZigBee technology, etc. In other implementations, current location 610 may be provided by a user of user device 110. For example, mechanism 620 may enable the user to input location information (e.g., an address, a zip code, a city/state, etc.). Mechanism 620 may include, for example, an input field, a drop-down menu providing location choices, and/or other similar input mechanisms.

Weather information 630 may be provided within user device 110 (e.g., within memory 230), and may be retrieved from memory 230 (e.g., by processing logic 310). Alternatively, weather information 630 may be retrieved by user device 110 from another device (e.g., server 120) via communication interface 340. Weather information 630 may include weather information (e.g., sun, rain, showers, drizzle, cloudy, partly cloudy, snow, sleet, freezing rain, flurries, barometric pressure, temperature, wind chill, dewpoint, humidity, heat index, and/or any other information associated with weather) associated with each day of the month (e.g., each day of January 2007) and with current location 610. As shown in FIG. 6, weather information 610 may include textual and/or visual weather information. Textual weather information may include text providing any of the above-mentioned weather information. For example, the date Jan. 31, 2007 may include textual weather information, such as "snow," "high temperature of 30° F.," and "low temperature of 20° F.". Visual weather information may include an image (e.g., an animation) which provides an indication of the weather for a particular day. For example, the date Jan. 31, 2007 may include an animation of a cloud and snow indicating snowy weather on that date. In other implementations, weather information 610 may include audio weather information, video weather information, and/or actual image weather information. For example, each calendar date may include an image depicting actual weather (e.g., an actual picture of the sun).

Weather information 630 may include past, present, and/or future weather. For example, if the current date is Jan. 23, 2007, weather information 630 depicted for Jan. 23, 2007 may be considered present weather, weather information 630 depicted for dates prior to Jan. 23, 2007 may be considered past weather, and weather information 630 depicted for dates after Jan. 23, 2007 may be considered future (or forecast) weather. The future or forecast weather may extend for a predetermined number of days into the future depending upon how far in the future the weather may be predicted. For example, the Farmer's Almanac provides weather predictions far into the future (e.g., weather forecasts for an entire winter season), whereas The Weather Channel may provide weather predictions in the near future (e.g., weather forecasts for ten days).

Past weather information may enable a user to look back in the calendar application at past calendar events (e.g., a past vacation one month ago), and obtain visual information of the weather, time of day, temperature, and/or other information aiding the user's memory and/or feelings about the past calendar events and their locations. For example, a user may look back at his/her vacation last winter in the Alps, and the past weather information may help the user recall and relish the experience of a perfectly sunny day when skiing was ideal.

Future weather information may enable a user to have a weather forecast when booking a calendar event in the future. For example, if the user wants to have an outdoor barbecue party, the user may browse the calendar application in the near future and may see the weather forecast which may be important to planning such an event. The user may thus select the best date weather-wise for the barbecue party.

Calendar information 640 may be provided within user device 110 (e.g., within memory 230), and may be retrieved from memory 230 (e.g., by processing logic 310). Alternatively, calendar information 640 may be retrieved by user device 110 from another device (e.g., server 120) via communication interface 340. Calendar information 640 may include calendar dates, calendar event information (e.g., meeting information, teleconference information, and/or any other calendar event information capable of being provided by calendar module 510), images, video, music, etc. associated with particular days of the calendar month. For example, Jan. 31, 2007 may include calendar information 640 indicating that a meeting is scheduled for that date.

Figure 7:
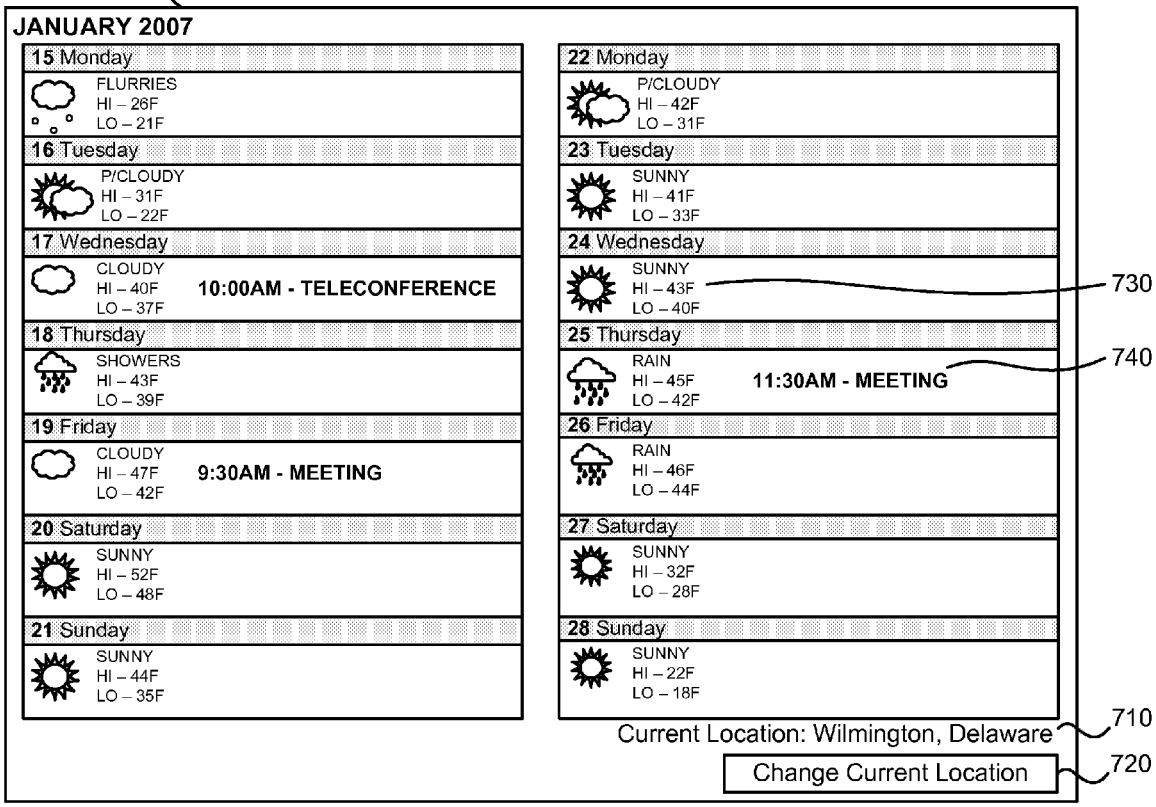
FIG. 7 is a diagram of an exemplary weekly display that may be provided by the user device of FIG. 1.

FIG. 7 is a diagram of an exemplary weekly display 700 that may be provided by user device 110 (e.g., by display 230 of user device 110). As shown, display 700 may include a weekly calendar per page (e.g., for the weeks of "Jan. 15-21, 2007" and "Jan. 22-28, 2007") that depicts the days of the weeks, a current location 710, a mechanism 720 to enable current location 710 to be changed, weather information 730 associated with each calendar day and current location 710, and/or calendar information 740 associated with each calendar day.

Current location 710 may provide an indication of a current location setting for user device 110. For example, in one implementation, current location 710 may be based on the actual location of user device 110, and may be determined in the variety of ways described above for current location 610. In other implementations, current location 710 may be provided by a user of user device 110. For example, mechanism 720 may enable the user to input location information (e.g., an address, a zip code, a city/state, etc.). Mechanism 720 may include, for example, an input field, a drop-down menu providing location choices, and/or other similar input mechanisms.

Weather information 730 may include weather information (e.g., including any of the information described above for weather information 630) associated with each day of the weeks displayed (e.g., each day of Jan. 15-28, 2007) and with current location 710. As shown in FIG. 7, weather information 730 may include textual and/or visual weather information. Textual weather information may include text providing any of the above-mentioned weather information. For example, the date Jan. 24, 2007 may include textual weather information, such as "sunny," "high temperature of 43° F.," and "low temperature of 40° F." Visual weather information may include an image (e.g., an animation) which provides an indication of the weather for a particular day. For example, the date Jan. 24, 2007 may include an image of a sun indicating sunny weather on that date. In other implementations, weather information 730 may include audio weather information, video weather information, and/or actual image weather information. For example, each calendar date of display 700 may include an image depicting actual weather (e.g., an actual picture of the sun). In still other implementations, weather information 730 may include past, present, and/or future weather, as described above for weather information 630.

Calendar information 740 may include calendar dates, calendar event information (e.g., meeting information, teleconference information, and/or any other calendar event information capable of being provided by calendar module 510) associated with particular days of display 700. For example, Jan. 25, 2007 may include calendar information 740 indicating that a meeting is scheduled for that date at a time of 11:30 AM.

Figure 8:
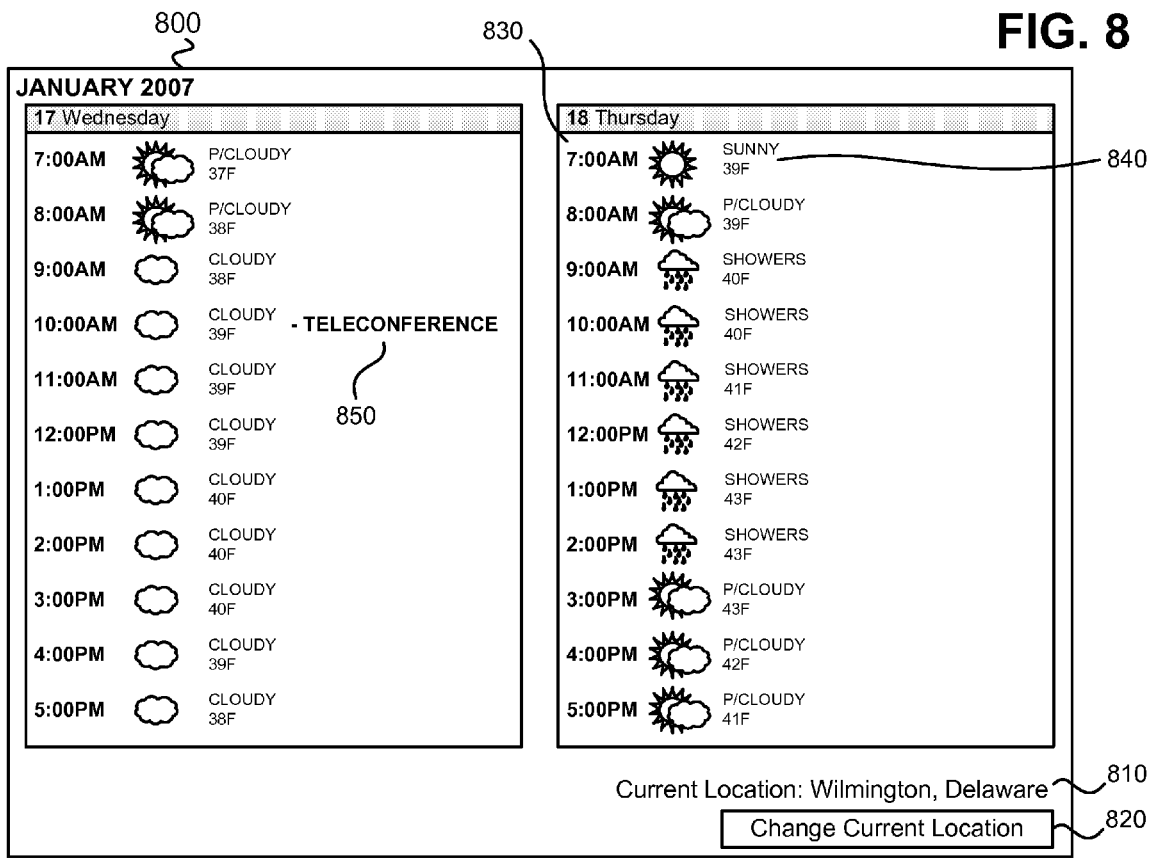
FIG. 8 is a diagram of an exemplary daily display that may be provided by the user device of FIG. 1.

FIG. 8 is a diagram of an exemplary daily display 800 that may be provided by user device 110 (e.g., by display 230 of user device 110). As shown, display 800 may include a daily calendar per page (e.g., for the days of "Jan. 17, 2007" and "Jan. 18, 2007") that depicts the days, a current location 810, a mechanism 820 to enable current location 810 to be changed, time increments 830 associated with each day, weather information 840 associated with each time increment 830 and current location 810, and/or calendar information 850 associated with particular time increments 830.

Current location 810 may provide an indication of a current location setting for user device 110. For example, in one implementation, current location 810 may be based on the actual location of user device 110, and may be determined in the variety of ways described above for current location 610. In other implementations, current location 810 may be provided by a user of user device 110. For example, mechanism 820 may enable the user to input location information (e.g., an address, a zip code, a city/state, etc.). Mechanism 820 may include, for example, an input field, a drop-down menu providing location choices, and/or other similar input mechanisms.

Time increments 830 may provide predetermined time intervals for each of the days of display 800. For example, as shown in FIG. 8, time increments 830 may provide hourly time intervals from "7:00 AM" to "5:00 PM." In other implementations, time increments 830 may provide other time intervals (e.g., every fifteen minutes, every thirty minutes, etc.) for a shorter or longer time period (e.g., from 6:00 AM to 6:00 PM).

Weather information 840 may include weather information (e.g., including any of the information described above for weather information 630) associated with each time increment 830 (e.g., 7:00 AM of Jan. 18, 2007) and with current location 810. As shown in FIG. 8, weather information 840 may include textual and/or visual weather information. Textual weather information may include text providing any of the above-mentioned weather information. For example, the date Jan. 18, 2007 may include textual weather information, such as "sunny" and "temperature of 39° F." at 7:00 AM, and textual weather information, such as "showers" and "temperature of 41° F." at 11:00 AM. Visual weather information may include an image (e.g., an animation) which provides an indication of the weather for a particular hour of each day of display 800. For example, the date Jan. 18, 2007 at 7:00 AM may include an image of a sun indicating sunny weather at that time on that date. Such hourly weather information 840 may provide a quick mechanism to determine how to plan for a day (e.g., what types of clothes to wear, whether to bring an umbrella, etc.). In other implementations, weather information 840 may include audio weather information, video weather information, and/or actual image weather information. For example, each time increment 830 of display 800 may include an image depicting actual weather (e.g., an actual picture of the sun). In still other implementations, weather information 840 may include past, present, and/or future weather, as described above for weather information 630.

Calendar information 850 may include calendar dates, calendar event information (e.g., meeting information, teleconference information, and/or any other calendar event information capable of being provided by calendar module 510) associated with each time increment 830. For example, Jan. 17, 2007 at 10:00 AM may include calendar information 850 indicating that a meeting is scheduled for that date and time.

Although FIGS. 6-8 show exemplary displays of user device 110, in other implementations, user device 110 may provide different displays than depicted in FIG. 6. For example, user 110 may provide a display that includes a day planner, a work week, a single day, a single week, etc. and/or corresponding weather and/or calendar information.

Exemplary Time Lapse Weather Displays

Figure 9:
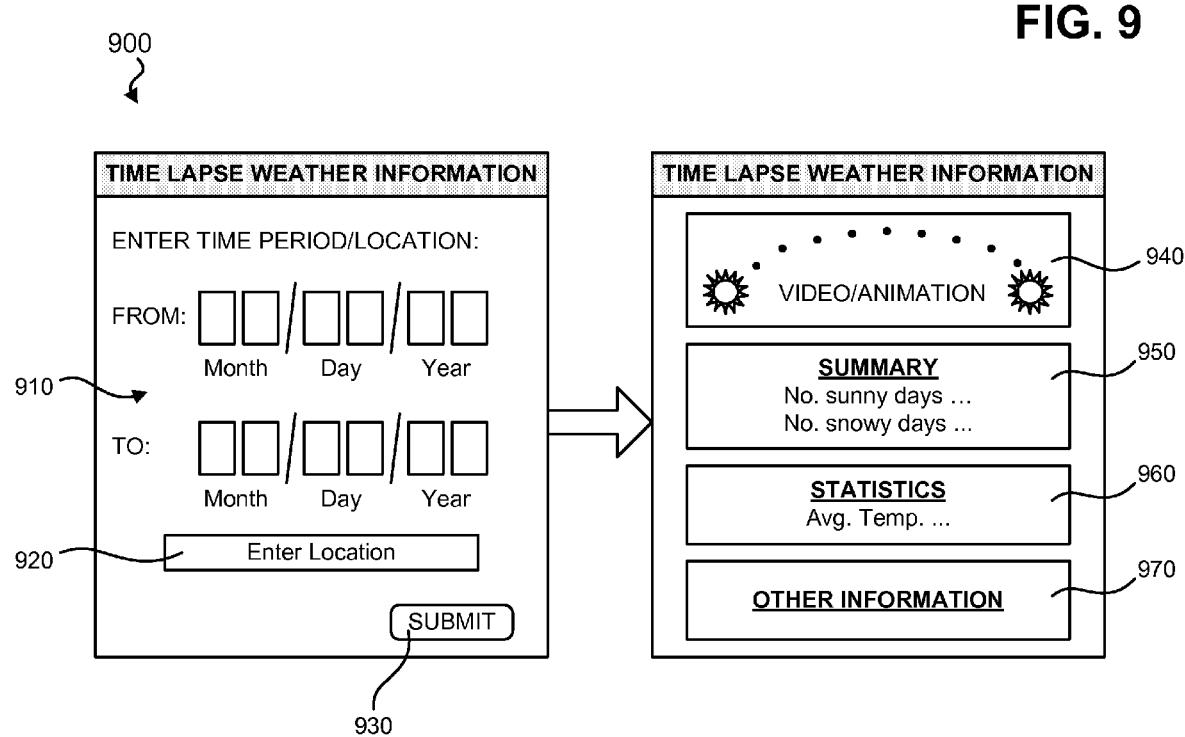
FIG. 9 is a diagram of exemplary time lapse weather displays that may be provided by the user device of FIG. 1.

FIG. 9 is a diagram of exemplary time lapse weather displays 900 that may be provided by the calendar application of user device 110 (e.g., via display 230). As shown to the left in FIG. 9, a user of user device 110 may enter a weather-based search query that includes a time period 910 and/or a location 920, and may submit the search query via selection of a submit mechanism 930. Time period 910 may include a mechanism for the user to input a time interval to search for weather information. For example, time period 910 may include a "From" month, day, and year, and a "To" month, day, and year. Location 920 may enable the user to input location information (e.g., an address, a zip code, a city/state, etc.). Location 920 may include, for example, an input field, a drop-down menu providing location choices, and/or other similar input mechanisms. Submit mechanism 930 may include a mechanism (e.g., an icon, link, button, and/or other similar selection mechanisms) that may be selected when the user hovers over or clicks on the mechanism.

If submit mechanism 930 is selected, weather information based on time period 910 and location 920 may be retrieved (e.g., from memory 320 of user device 110 or from another device, such as server 120) by user device 110. As shown to the right in FIG. 9, if submit mechanism 930 is selected, a weather video and/or animation 940, a weather summary 950, weather statistics 960, and/or other calendar information 970 may be generated (e.g., by calendar module 510) that are associated with time period 910 and location 920. Weather video/animation 940 may include a time lapse video or animation that provides the weather over time period 910 for the user-selected location 920. For example, if time period 910 is set for one sunny day, weather video/animation 940 may show the sun rising, moving across the skyline, and eventually setting. In one implementation, a date and/or time indicator (not shown) may be provided with weather video/animation 940 so that the user may associate dates and/or times with particular weather patterns.

In another implementation, weather video/animation 940 may be created based on a user's browsing actions through the calendar. For example, if the user is browsing back and forth in time in the calendar, weather video/animation 940 may provide weather video/animation 940 based on how quickly the user is browsing through the calendar. User device 110 (e.g., via calendar module 510) may calculate the speed of the browsing in the number of days passed per unit time. This information along with how long the user stops at particular calendar dates and the difference in weather between calendar dates may be used to dynamically change the length of weather video/animation 940 and the transitions within weather video/animation 940.

Weather summary 950 may provide information summarizing the weather at location 920 over the course of time period 910. For example, weather summary 950 may include the number of sunny days, the number of snowy days, the number of rainy days, etc. at location 920 for time period 910. Weather statistics 960 may provide statistical information about the weather at location 920 over the course of time period 910. For example, weather statistics 960 may include the average temperature, the average rainfall, the average snowfall, etc. at location 920 for time period 910.

Other calendar information 970 may provide calendar event information over the course of time period 910. For example, other calendar information 970 may include which days the user had meetings, went skiing, went to the beach, had teleconferences, etc. for time period 910.

Exemplary Weather-Based Search

Figure 10:
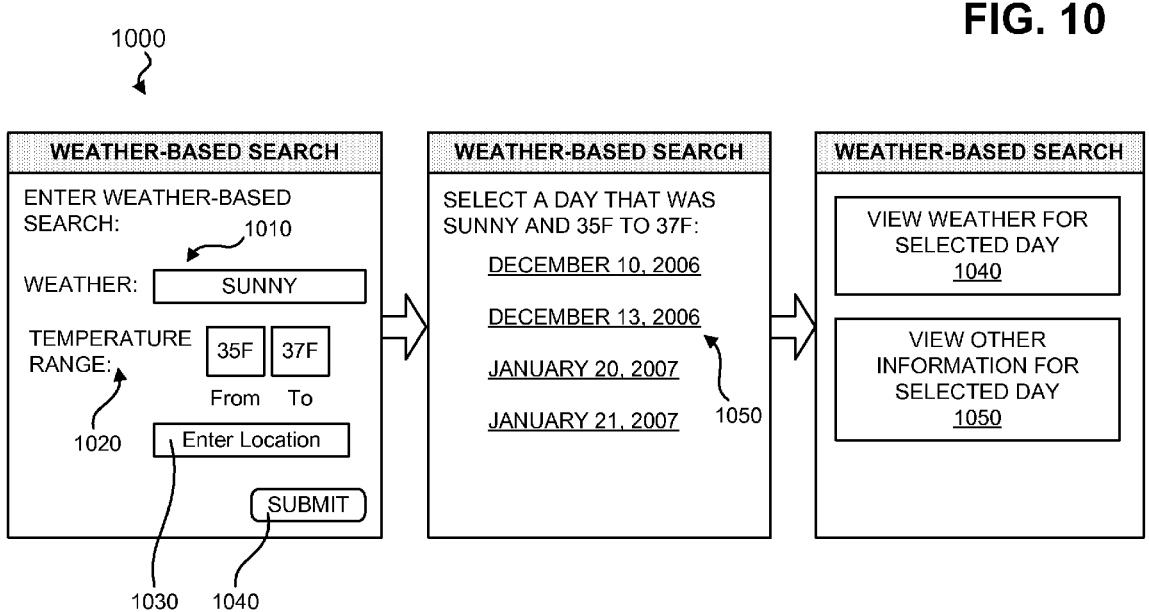
FIG. 10 is a diagram of exemplary weather-based search displays that may be provided by the user device of FIG. 1.

FIG. 10 is a diagram of exemplary weather-based search displays 1000 that may be provided by the calendar application of user device 110 (e.g., via display 230). As shown to the left in FIG. 10, a user of user device 110 may enter a weather-based search query that includes a weather type 1010, a temperature range 1020, and/or a location 1030, and may submit the search query via selection of a submit mechanism 1040. Weather type 1010 may include, for example, an input field, a drop-down menu providing weather type choices, and/or other similar input mechanisms. For example, the user may input "sunny" for weather type 1010. Temperature range 1020 may include a mechanism for the user to input a temperature range to search for weather information. For example, temperature range 1020 may include a "From" temperature (e.g., 35° F.) and a "To" temperature (e.g., 37° F.). Location 1030 may enable the user to input location information (e.g., an address, a zip code, a city/state, etc.) for the weather search. Location 1030 may include, for example, an input field, a drop-down menu providing location choices, and/or other similar input mechanisms. Submit mechanism 1040 may include a mechanism (e.g., an icon, link, button, and/or other similar selection mechanisms) that may be selected when the user hovers over or clicks on the mechanism.

As shown in the middle of FIG. 10, results 1050 of the weather-based search query may be displayed to the user. Results 1050 may include calendar dates for days matching the criteria set forth in the weather-based search query. For example, in one implementation, past weather information (e.g., provided with user device 110 or retrieved by user device 110, e.g., from server 120) may be searched based on the weather-based search query. Past weather information may be identified that is related to the weather-based search query. Calendar dates associated with the identified past weather information may be identified and ranked based on a match between the past weather information and the search criteria of the weather-based search query. The calendar dates may be sorted based on the ranks, and results 1050 may be generated based on the sorted calendar dates.

If a user selects one of results 1050 (e.g., when the user hovers over or clicks on one of results 1050), weather 1060 and/or other calendar information 1070 for the selected day may be provided, as shown to the right in FIG. 10. Weather 1060 may include any of the weather information described previously (e.g., weather information 630, weather video/animation 940 (for the selected day), etc.). Other calendar information 1070 may include any of the calendar information described previously (e.g., calendar information 640).

Exemplary Weather-Based Event Planning

Figure 11:
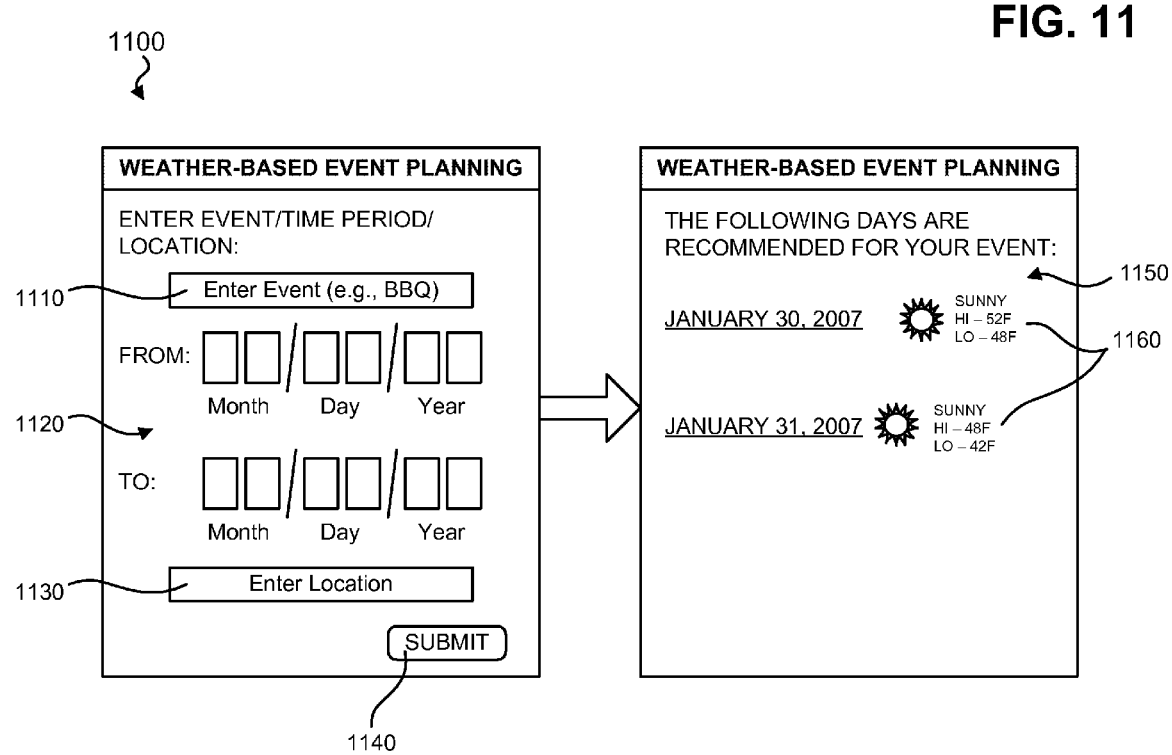
FIG. 11 is a diagram of exemplary weather-based event planning displays that may be provided by the user device of FIG. 1.

FIG. 11 is a diagram of an exemplary weather-based event planning displays 1100 that may be provided by the calendar application of user device 110 (e.g., via display 230). As shown to the left in FIG. 11, a user of user device 110 may enter a weather-based calendar event search query that includes an event type 1110, a time period 1120, and/or a location 1130, and may submit the search query via selection of a submit mechanism 1140. Event type 1110 may include, for example, an input field, a drop-down menu providing calendar event type choices, and/or other similar input mechanisms. For example, the user may input "barbecue" for event type 1110. Alternatively, event type 1110 may be replaced with a weather type similar to weather type 1010. Time period 1120 may include a mechanism for the user to input a time interval to search for the weather-based event. For example, time period 1020 may include a "From" month, day, and year, and a "To" month, day, and year. Location 1130 may enable the user to input location information (e.g., an address, a zip code, a city/state, etc.) for the event. Location 1130 may include, for example, an input field, a drop-down menu providing location choices, and/or other similar input mechanisms. Submit mechanism 1140 may include a mechanism (e.g., an icon, link, button, and/or other similar selection mechanisms) that may be selected when the user hovers over or clicks on the mechanism.

As shown to the right of FIG. 11, results 1150 of the weather-based calendar event search query may be displayed to the user. Results 1150 may include calendar dates and weather information 1160 for days matching the criteria set forth in the weather-based calendar event search query. Weather information 1160 may include any of the weather information described previously (e.g., weather information 630, weather video and/or animation 940 (for the selected day), etc.). For example, in one implementation, future weather information (e.g., provided with user device 110 or retrieved by user device 110, e.g., from server 120) may be searched based on the weather-based calendar event search query. Future weather information may be identified that is related to the weather-based calendar event search query. Calendar dates associated with the identified future weather information may be identified and ranked based on a match between the future weather information and the search criteria of the weather-based calendar event search query. The calendar dates may be sorted based on the ranks, and results 1150 may be generated based on the sorted calendar dates.

If a user selects one of results 1150 (e.g., when the user hovers over or clicks on one of results 1050), event type 1110 may be added to the calendar on the calendar date associated with the selected result 1150. Although not shown in FIG. 11, in one implementation, the user may also enter other calendar information associated with event type 1110 on the calendar date associated with the selected result 1150. In another implementation, the user may be provided with weather updates for the scheduled calendar event. For example, if the user scheduled an outdoor party for a particular date and the weather forecast changes from sunny to rainy for that particular date, the user may be notified of the weather change. Alternative dates (e.g., with sunny weather) may also be provided to the user.

Exemplary Processes

Figure 12:
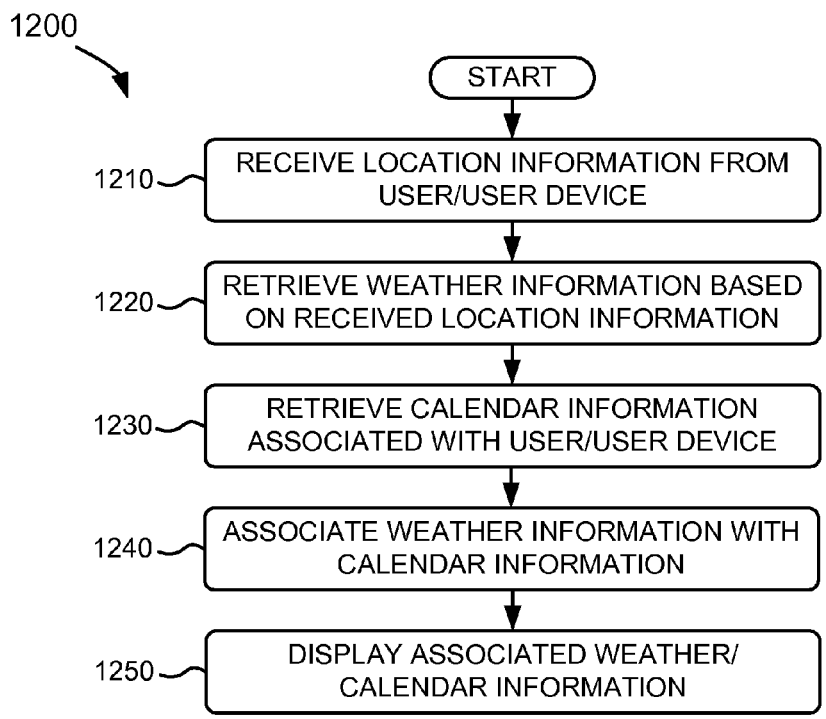
FIGS. 12-15 depict flow charts of exemplary processes according to implementations described herein.
Figure 13:
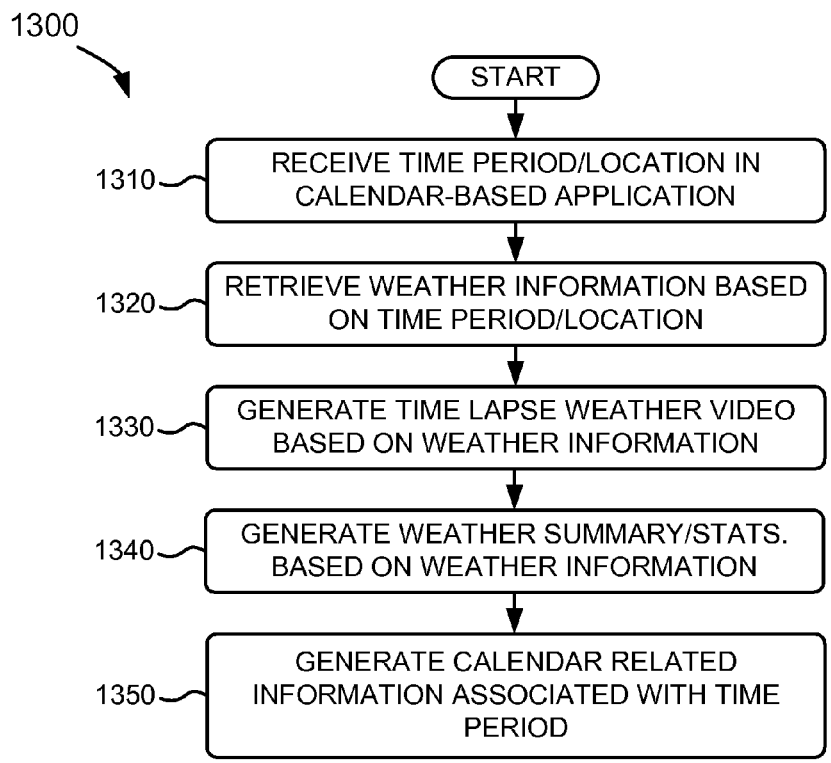
Figure 14:
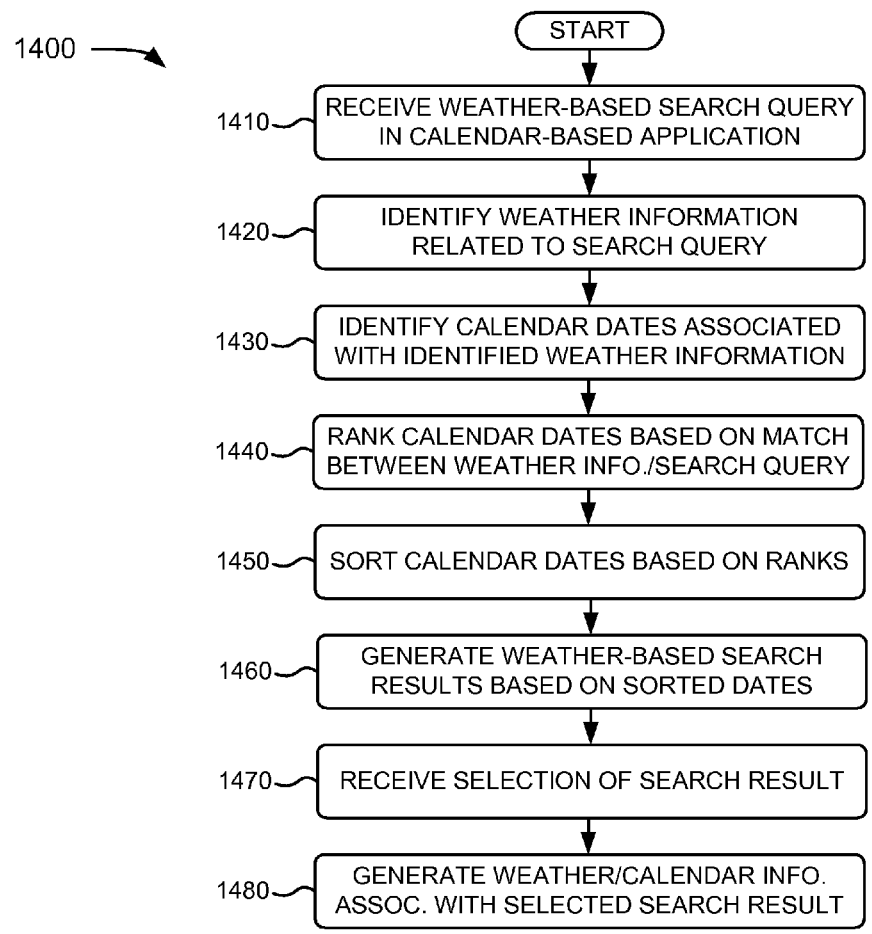
Figure 15:
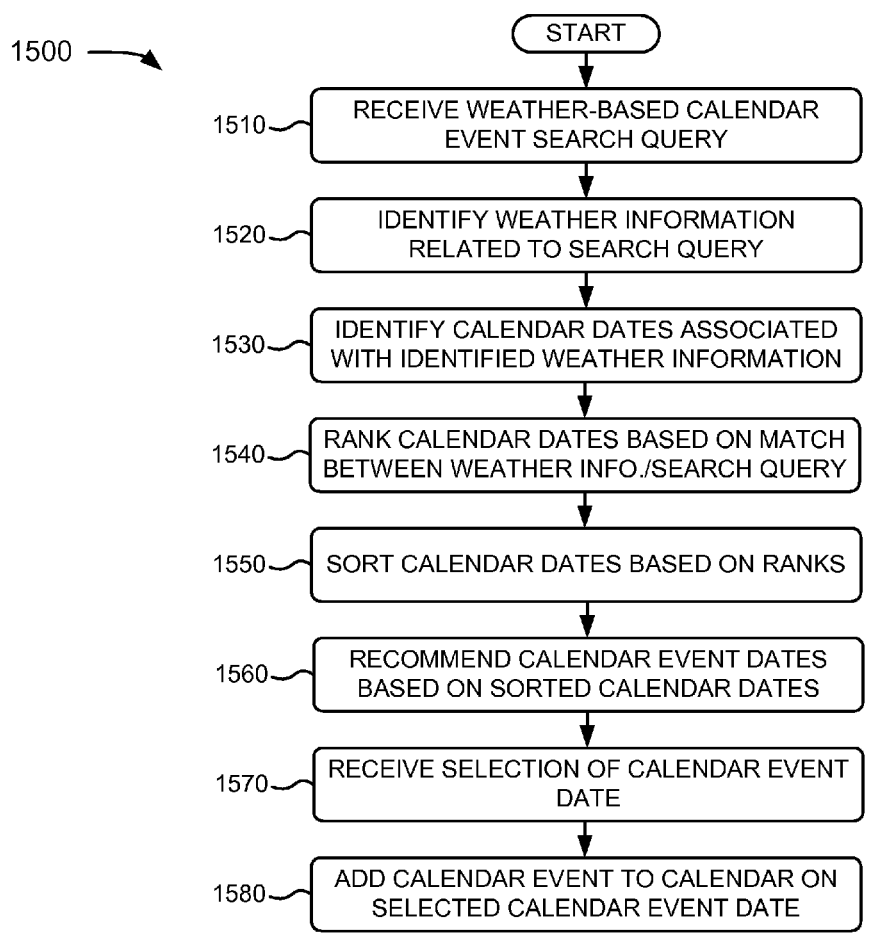

FIGS. 12-15 depict flow charts of exemplary processes according to implementations described herein. Generally, FIG. 12 depicts an exemplary process 1200 for providing weather information associated with calendar information, FIG. 13 depicts an exemplary process 1300 for generating time lapse weather information, FIG. 14 depicts an exemplary process 1400 for performing a weather-based search, and FIG. 15 depicts an exemplary process 1500 for performing weather-based event planning. Processes 1200-1500 may be performed by hardware and/or software components on user device 110, server 120, or a combination of user device 110 and server 120.

Process for Providing Weather Information Associated with Calendar Information

Process 1200 may begin with receipt of location information from a user of a user device or from the user device (block 1210). For example, in one implementation described above in connection with FIG. 6, current location 610 may provide an indication of a current location setting for user device 110. In one example, current location 610 may be based on the actual location of user device 110, and may be determined in a variety of ways, e.g., using Bluetooth communication, GPS communication, cell identification, wireless fidelity (Wi-Fi) communication, World Interoperability for Microwave Access (WiMAX) communication, Near Field Communication (NFC) technology, ZigBee technology, etc. In another example, mechanism 620 may enable the user to input location information (e.g., an address, a zip code, a city/state, etc.) for current location 610. Mechanism 620 may include, for example, an input field, a drop-down menu providing location choices, and/or other similar input mechanisms.

Weather information may be retrieved based on the received location information (block 1220). For example, in one implementation described above in connection with FIG. 6, weather information 630 may be provided within user device 110 (e.g., within memory 230), and may be retrieved from memory 230 (e.g., by processing logic 310). Alternatively, weather information 630 may be retrieved by user device 110 from another device (e.g., server 120) via communication interface 340. Weather information 630 may include weather information (e.g., sun, rain, showers, drizzle, cloudy, partly cloudy, snow, sleet, freezing rain, flurries, barometric pressure, temperature, wind chill, dewpoint, humidity, heat index, and/or any other information associated with weather) associated with each day of the month (e.g., each day of January 2007) and with current location 610.

As further shown in FIG. 12, calendar information associated with the user and/or the user device may be retrieved (block 1230). For example, in one implementation described above in connection with FIG. 6, calendar information 640 may be provided within user device 110 (e.g., within memory 230), and may be retrieved from memory 230 (e.g., by processing logic 310). Alternatively, calendar information 640 may be retrieved by user device 110 from another device (e.g., server 120) via communication interface 340. Calendar information 640 may include calendar dates, calendar event information (e.g., meeting information, teleconference information, and/or any other calendar event information capable of being provided by calendar module 510), images, video, music, etc. associated with particular days of the calendar month.

The weather information may be associated with the calendar information (block 1240), and the associated weather and calendar information may be displayed (block 1250). For example, in one implementation described above in connection with FIG. 6, display 600 may include a monthly calendar (e.g., for the month of "January 2007") that depicts the days of the month, weather information 630 associated with each calendar day and current location 610, and/or calendar information 640 associated with each calendar day.

Process for Generating Time Lapse Weather Information

As shown in FIG. 13, process 1300 may begin with receipt of a time period and a location in a calendar-based application (block 1310). For example, in one implementation described above in connection with FIG. 9, a user of user device 110 may enter a weather-based search query that includes time period 910 and/or location 920, and may submit the search query via selection of submit mechanism 930. Time period

910 may include a mechanism for the user to input a time interval to search for weather information. Location 920 may enable the user to input location information (e.g., an address, a zip code, a city/state, etc.). Location 920 may include, for example, an input field, a drop-down menu providing location choices, and/or other similar input mechanisms. Submit mechanism 930 may include a mechanism (e.g., an icon, link, button, and/or other similar selection mechanisms) that may be selected when the user hovers over or clicks on the mechanism.

Weather information may be retrieved based on the time period and the location (block 1320). For example, in one implementation described above in connection with FIG. 9, if submit mechanism 930 is selected, weather information based on time period 910 and location 920 may be retrieved (e.g., from memory 320 of user device 110 or from another device, such as server 120) by user device 110.

As further shown in FIG. 13, a time lapse weather video and/or animation may be generated based on the retrieved weather information (block 1330). For example, in one implementation described above in connection with FIG. 9, if submit mechanism 930 is selected, weather video/animation 940 may be generated (e.g., by calendar module 510) that is associated with time period 910 and location 920. Weather video/animation 940 may include a time lapse video or animation that provides the weather over time period 910 for the user-selected location 920. In one example, weather video/animation 940 may be created based on a user's browsing actions through the calendar. If the user is browsing back and forth in time in the calendar, weather video/animation 940 may provide weather video/animation 940 based on how quickly the user is browsing through the calendar. User device 110 (e.g., via calendar module 510) may calculate the speed of the browsing in the number of days passed per unit time. This information along with how long the user stops at particular calendar dates and the difference in weather between calendar dates may be used to dynamically change the length of weather video/animation 940 and the transitions within weather video/animation 940.

A weather summary and/or weather statistics may be generated based on the retrieved weather information (block 1340). For example, in one implementation described above in connection with FIG. 9, if submit mechanism 930 is selected, weather summary 950 and/or weather statistics 960 may be generated (e.g., by calendar module 510) that are associated with time period 910 and location 920. Weather summary 950 may provide information summarizing the weather at location 920 over the course of time period 910. Weather statistics 960 may provide statistical information about the weather at location 920 over the course of time period 910.

As further shown in FIG. 13, calendar related information that is associated with the time period may be generated (block 1350). For example, in one implementation described above in connection with FIG. 9, if submit mechanism 930 is selected, other calendar information 970 may be generated (e.g., by calendar module 510) that is associated with time period 910 and location 920. Other calendar information 970 may provide calendar event information over the course of time period 910.

Process for Performing Weather-Based Search

As shown in FIG. 14, process 1400 may begin with receipt of a weather-based search query in a calendar-based application (block 1410). For example, in one implementation described above in connection with FIG. 10, a user of user device 110 may enter a weather-based search query that includes weather type 1010, temperature range 1020, and/or location 1030, and may submit the search query via selection of submit mechanism 1040. Weather type 1010 may include, for example, an input field, a drop-down menu providing weather type choices, and/or other similar input mechanisms. Temperature range 1020 may include a mechanism for the user to input a temperature range to search for weather information. Location 1030 may enable the user to input location information (e.g., an address, a zip code, a city/state, etc.) for the weather search. Location 1030 may include, for example, an input field, a drop-down menu providing location choices, and/or other similar input mechanisms. Submit mechanism 1040 may include a mechanism (e.g., an icon, link, button, and/or other similar selection mechanisms) that may be selected when the user hovers over or clicks on the mechanism.

Weather information related to the weather-based search query may be identified (block 1420). For example, in one implementation described above in connection with FIG. 10, past weather information (e.g., provided with user device 110 or retrieved by user device 110, e.g., from server 120) may be searched based on the weather-based search query. Past weather information may be identified that is related to the weather-based search query.

As further shown in FIG. 14, calendar dates associated with the identified weather information may be identified (block 1430). For example, in one implementation described above in connection with FIG. 10, calendar dates associated with the identified past weather information may be identified.

The identified calendar dates may be ranked based on a match between the identified weather information and the weather-based search query (block 1440). For example, in one implementation described above in connection with FIG. 10, the identified calendar dates associated with the identified past weather information may be ranked based on a match between the past weather information and the search criteria of the weather-based search query.

As further shown in FIG. 14, the calendar dates may be sorted based on the ranks (block 1450). For example, in one implementation described above in connection with FIG. 10, the identified, ranked calendar dates associated with the identified past weather information may be sorted based on the ranks.

Weather-based search results may be generated based on the sorted dates (block 1460). For example, in one implementation described above in connection with FIG. 10, results 1050 of the weather-based search query may be generated (e.g., displayed to the user) based on the sorted calendar dates.

As further shown in FIG. 14, selection of a weather-based search result may be received (block 1470), and weather information and/or calendar information associated with the selected weather-based search result may be generated (block 1480). For example, in one implementation described above in connection with FIG. 10, if a user selects one of results 1050, weather 1060 and/or other calendar information 1070 for the selected day may be provided, as shown to the right in FIG. 10. Weather 1060 may include any of the weather information described previously (e.g., weather information 630, weather video/animation 940 (for the selected day), etc.). Other calendar information 1070 may include any of the calendar information described previously (e.g., calendar information 640).

Process for Performing Weather-Based Event Planning

As shown in FIG. 15, process 1500 may begin with receipt of a weather-based calendar event search query in a calendar-based application (block 1510). For example, in one implementation described above in connection with FIG. 11, a user of user device 110 may enter a weather-based calendar event search query that includes event type 1110, time period 1120, and/or location 1130, and may submit the search query via selection of submit mechanism 1140. Event type 1110 may include, for example, an input field, a drop-down menu providing calendar event type choices, and/or other similar input mechanisms. Time period 1120 may include a mechanism for the user to input a time interval to search for the weather-based event. Location 1130 may enable the user to input location information (e.g., an address, a zip code, a city/state, etc.) for the event. Submit mechanism 1140 may include a mechanism (e.g., an icon, link, button, and/or other similar selection mechanisms) that may be selected when the user hovers over or clicks on the mechanism.

Weather information related to the weather-based calendar event search query may be identified (block 1520). For example, in one implementation described above in connection with FIG. 11, future weather information (e.g., provided with user device 110 or retrieved by user device 110, e.g., from server 120) may be searched based on the weather-based calendar event search query. Future weather information may be identified that is related to the weather-based calendar event search query.

As further shown in FIG. 15, calendar dates associated with the identified weather information may be identified (block 1530). For example, in one implementation described above in connection with FIG. 11, calendar dates associated with the identified future weather information may be identified.

The identified calendar dates may be ranked based on a match between the identified weather information and the weather-based calendar event search query (block 1540). For example, in one implementation described above in connection with FIG. 11, the identified calendar dates associated with the identified future weather information may be ranked based on a match between the future weather information and the search criteria of the weather-based calendar event search query.

As further shown in FIG. 15, the calendar dates may be sorted based on the ranks (block 1550). For example, in one implementation described above in connection with FIG. 11, the identified, ranked calendar dates associated with the identified future weather information may be sorted based on the ranks.

Calendar event dates may be recommended based on the sorted dates (block 1560). For example, in one implementation described above in connection with FIG. 11, results 1150 of the weather-based calendar event search query may be generated (e.g., displayed to the user) based on the sorted calendar dates. Results 1150 may include calendar dates and weather information 1160 for days matching the criteria set forth in the weather-based calendar event search query. Weather information 1160 may include any of the weather information described previously (e.g., weather information 630, weather video and/or animation 940 (for the selected day), etc.).

As further shown in FIG. 15, selection of a recommended calendar event date may be received (block 1570), and the calendar event may be added to the calendar on the selected calendar event date (block 1580). For example, in one implementation described above in connection with FIG. 11, if a user selects one of results 1150, event type 1110 may be added to the calendar on the calendar date associated with the selected result 1150. In another implementation, the user may be provided with weather updates for the scheduled calendar event.

CONCLUSION

Implementations described herein may provide weather information with a calendar application. For example, in one implementation, the weather information may be displayed in the calendar application on a monthly, weekly, daily, hourly, per calendar event, etc. basis for past, present, and/or future weather. In another implementation, the weather information may be associated with a location selected by a calendar application user and/or a location indicating the current location of the calendar application user. In still another implementation, the calendar application user may specify a time period and/or a location, and the calendar application may generate a time lapse weather video and/or animation, a weather summary, weather statistics, and/or other calendar information associated with the time period and/or location. In a further implementation, the calendar application user may provide a weather-based search query (e.g., which may include a type of weather, a temperature range, a location, etc.), and the calendar application may provide a list of one or more day(s) matching the weather-based search query. In still a further implementation, the calendar application user may provide a weather-based calendar event search query (e.g., which may include an event type, a time period, a location, etc.), and the calendar application may recommend a list of one or more day(s) matching the weather-based calendar event search query.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 12-15, the order of the acts may be modified in other implementations. Further, non-dependent acts may be performed in parallel.

Also, the term "user" has been used herein. The term "user" is intended to be broadly interpreted to include a user device or a user of a user device.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, at a user device, location information from a user;
   retrieving, at the user device, weather information based on the received location information;
   retrieving calendar information associated with the user;
   associating, at the user device, the weather information with the calendar information in a calendar application;
   generating, at the user device, a time-lapse weather video or a weather-related animation, where content of the time-lapse weather video or the weather-related animation is based on a speed with which a user browses through the calendar information; and presenting the time-lapse weather video or the weather related animation on a display associated with the user device.

2. The method of claim 1, where receiving location information from the user comprises one of:
   receiving location information related to a location of the user; or
   receiving location information unrelated to the location of the user.

3. The method of claim 1, where retrieving weather information comprises at least one of:
   retrieving one of past, present, or future weather information based on the received location information; or
   retrieving one of monthly, weekly, daily, or hourly weather information based on the received location information.

4. The method of claim 1, where retrieving calendar information comprises:
   retrieving the calendar application for use by the user.

5. The method of claim 4, where retrieving the calendar application comprises at least one of:
   retrieving an Internet-based calendar application;
   retrieving a calendar creation application; or
   retrieving a personal information manager (PIM) application.

6. A method, comprising:
   receiving, at a user device, a time period and a location in a calendar-based application;
   retrieving, at the user device, weather information based on the received time period and location;
   calculating a user browsing speed of a user through dates of the calendar-based application in a number of days passed per unit time;
   determining a user pause time of the user at particular dates of the calendar-based application;
   determining weather differences between browsed dates of the calendar-based application;
   dynamically generating a time-lapse weather video or a weather-related animation, where subject matter of the time-lapse weather video or the weather related animation is based on the user browsing speed, the user pause time, and the weather differences between browsed dates of the calendar-based application and;
   presenting the time-lapse weather video or the weather related animation on a display associated with the user device.

7. The method of claim 6, further comprising:
   generating one of a weather summary or weather statistics based on the retrieved weather information.

8. The method of claim 6, further comprising:
   generating calendar-related information associated with the time period.

9. A system implemented within at least one of a device-implemented server, a user device, or a combination of the device-implemented server and the user device, comprising:
   a device-implemented means for receiving location information from one of a user or the user device in a calendar-based application;
   a device-implemented means for retrieving weather information based on the received location information;
   a device-implemented means for retrieving calendar information associated with the user from the calendar-based application;
   a device-implemented means for associating the weather information with the calendar information in the calendar-based application;
   a device-implemented means for displaying, at the user device, the associated weather information and calendar information in the calendar-based application;
   a device-implemented means for receiving a time period in the calendar-based application;
   a device-implemented means for retrieving time period weather information based on the time period and the location information; and
   a device-implemented means for generating, at the user device, a time-lapse weather video or a weather-related animation, based on the time period weather information, where the content of the time-lapse weather video or the weather-related animation is based on a speed at which the user browses through the calendar information; and
   presenting the time-lapse weather video or the weather-related animation on a display associated with the user device.

10. The system of claim 9, further comprising:
    means for receiving a weather-based search query in the calendar-based application;
    means for identifying query weather information and calendar dates related to the weather-based search query;
    means for ranking the calendar dates based on a degree of match between the identified query weather information and the weather-based search query;
    means for sorting the ranked calendar dates based on the ranks; and
    means for generating weather-based search results based on the sorted calendar dates.

11. The system of claim 9, further comprising:
    means for receiving a weather-based calendar event search query in the calendar-based application;
    means for identifying query weather information and calendar dates related to the weather-based calendar event search query;
    means for ranking the calendar dates based on a degree of match between the identified query weather information and the weather-based calendar event search query;
    means for sorting the ranked calendar dates based on the ranks; and
    means for recommending calendar event dates based on the sorted calendar dates.

12. A device, comprising:
    a memory to store a plurality of instructions; and
    a processor to execute instructions in the memory to:
       receive location information from a user;
       retrieve weather information based on the received location information;
       retrieve calendar information associated with the user;
       associate the weather information with the calendar information in a calendar-based application;
       receive a weather-based calendar event search query in the calendar-based application, where the weather-based calendar event search query includes an event type, a time period and a location associated with the event type;
       identify query weather information based on the weather-based calendar event search query;
       rank the calendar dates based on a degree of match between the identified query weather information and the weather-based calendar event search query;
       sort the ranked calendar dates based on the ranks;

generate weather-based search results based on the sorted calendar dates;

receive, at the user device, a selection of a recommended calendar event dates;

schedule a calendar event in the calendar-based application on one of the recommended calendar event dates; and generate, at the user device, a time-lapse weather video or a weather-related animation, based on the identified query weather information, where the content of the time-lapse weather video or the weather-related animation is based on a speed at which a user browses through the calendar information; and present the time-lapse weather video or the weather related animation on a display associated with the user device.

13. The device of claim 12, where the processor further executes instructions in the memory to:

recommend calendar event dates based on the sorted calendar dates.

14. A memory device that stores computer-executable instructions that when executed by a processor, cause the processor to:

receive location information from a user;

retrieve weather information based on the received location information;

retrieve calendar information associated with the user;

associate the weather information with the calendar information in a calendar-based application;

receive a weather-based calendar event search query in the calendar-based application where the weather-based calendar event search query includes at least an event type and a time period associated with the event type;

identify query weather information based on the weather-based search query;

rank the calendar dates based on a degree of match between the identified query weather information and the weather-based search query;

sort the ranked calendar dates based on the ranks; and generate a time-lapse weather video or a weather-related animation, where the content of the time-lapse weather video or the weather related animation is based on a speed at which a user browses through the sorted calendar dates; and present the time-lapse weather video or the weather related animation on a display associated with the user device.

15. A device, comprising:

a memory to store a plurality of instructions; and a processor to execute instructions in the memory to:

receive location information from a user;

retrieve weather information based on the received location information;

retrieve calendar information associated with the user;

associate the weather information with the calendar information in a calendar application;

generate a time-lapse weather video or a weather-related animation, where a content of the time-lapse weather video or the weather-related animation is based on a speed with which a user browses through the calendar information; and present the time-lapse weather video or the weather related animation on a display associated with the user device.

* * * * *